B. M. W. HANSON.
LUBRICATING MECHANISM FOR MULTIPLE SPINDLE DRILLS.
APPLICATION FILED JULY 1, 1907.

989,002.

Patented Apr. 11, 1911.

Witnesses:
H. E. Anderson
L. E. Blodgett

Inventor:
Bengt M. W. Hanson
By his Attorney,

UNITED STATES PATENT OFFICE.

BENGT M. W. HANSON, OF HARTFORD, CONNECTICUT.

LUBRICATING MECHANISM FOR MULTIPLE-SPINDLE DRILLS.

989,002.

Specification of Letters Patent.  Patented Apr. 11, 1911.

Application filed July 1, 1907. Serial No. 381,644.

*To all whom it may concern:*

Be it known that I, BENGT M. W. HANSON, a citizen of Sweden, residing at Hartford, in the county of Hartford and State of Connecticut, have invented certain new and useful Improvements in Lubricating Mechanism for Multiple-Spindle Drills, of which the following is a specification.

This invention relates to lubricating devices especially adapted for multiple-spindle-drills, and has for its object the provision of means, whereby a tool-spindle may be adjusted to various positions without affecting its relation to a lubricant-conduit leading to a tool carried by said spindle.

Another object of the invention is the provision of means for supplying a series of tools carried by adjustable spindles, with lubricant in such a manner that it will be applied in the most desirable way, regardless of the positioning of said spindles.

Other objects of the invention will be hereinafter set forth.

Figure 1:
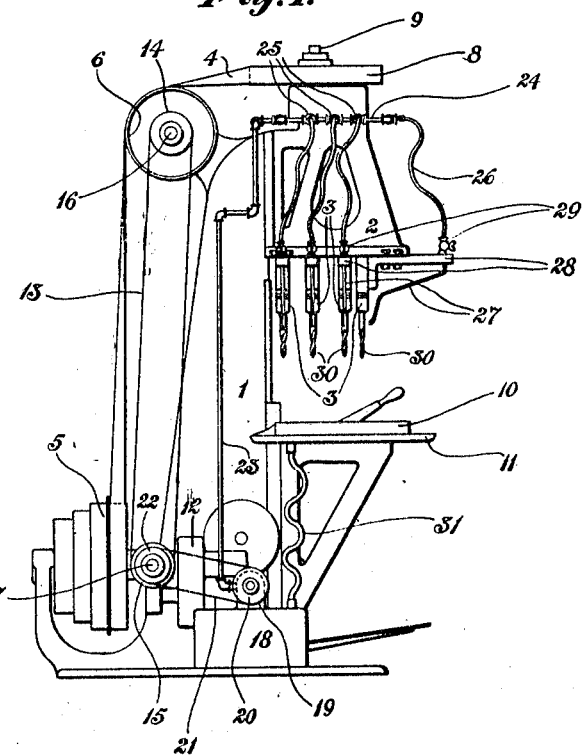
Figure 2:
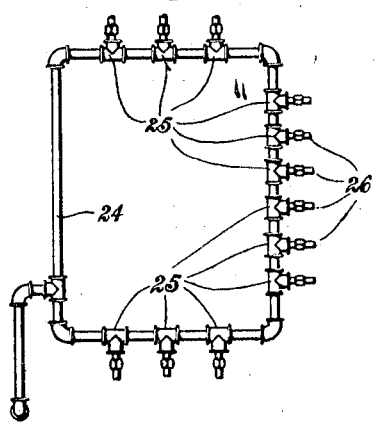
Figure 3:
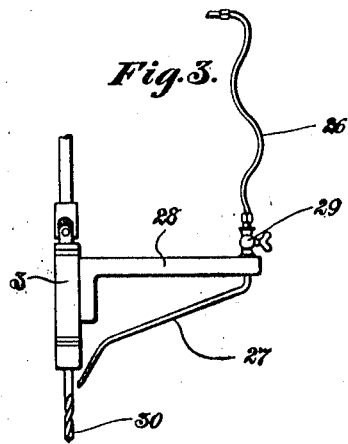

In the accompanying drawings, Figure 1 is a side elevation of an adjustable multiple-spindle drill equipped with my improved lubricating device. Fig. 2 is a detail plan view, and Fig. 3 is a detail view of one of the adjustable spindles.

Like numerals designate similar parts throughout the several views.

To illustrate my invention I have shown it applied to a drill-press comprising a column 1 having a head 2 in which are mounted spindles 3, the lower or tool carrying portions of which are transversely adjustable.

A belt 4 passes around a driving-pulley 5, over idler-pulleys 6 and around a pulley 8 which is mounted on shaft 9, and through gearing (not shown) rotates said spindles. The usual table 10, slidable vertically on ways of the column, is surrounded by a pan 11, and is provided with power-feeding mechanism 12, which is driven by belt 13, passing over pulleys 14 and 15, mounted, respectively, on idler-shaft 16, and shaft 17.

Designated by 18 is an oil-tank, and by 19 a pump having a driving-pulley 20, which is driven by a belt 21 passing over a pulley 22 on shaft 17.

From pump 19 a feed-pipe 23 leads to an endless conduit 24, which is provided with T-couplings 25 for the reception of flexible tubes 26, which lead to fixed pipes 27 supported by arms 28 rigidly connected with the respective swinging or tool carrying portions of the spindles 3. On the upper side of each arm 28 the fixed pipes 27 are each provided with a stop-cock 29, so that the flow of lubricant over the tools 30 may be regulated as desired.

The pan 11 receives the lubricant as it flows from the tools 30, said lubricant passing from the pan through a flexible tube 31 back into the supply-tank 18.

It is obvious that the adjustable part of each tool spindle may be placed as desired without changing the relative position of the tools carried thereby, as regards the rigid lubricant pipes 27 the delivery ends of the respective pipes 27 being, as will be seen, adapted to supply the lubricant directly on to the drills carried directly by the adjustable portions of the spindles.

Thus a great advantage is secured over other methods of lubricating which require considerable time for proper adjustment and a careful operator to see that lubricant is directed upon all the tools in use.

Having thus described the invention, what I claim is:—

1. The combination of a spindle having a transversely adjustable tool carrying portion, a pipe rigidly connected with said tool carrying portion, and leading to the tool carried thereby, a flexible pipe connected with the other pipe, and means for supplying said flexible pipe with lubricant.

2. The combination of a series of spindles each having an adjustable tool carrying portion, arms rigidly connected with the respective tool carrying portions, stiff pipes rigidly connected with the respective arms, for supplying the tools on the said adjustable portions with lubricant, a flexible pipe connected with each of the other pipes and means for supplying the flexible pipes with lubricant.

3. The combination of a series of spindles each having a transversely adjustable tool carrying portion, stiff pipes connected rigidly with the respective adjustable tool carrying portions, a substantially continuous duct, flexible pipes connecting said substantially continuous duct with said stiff pipes, and means for supplying said duct with a lubricant.

In testimony whereof I affix my signature in presence of two witnesses.

BENGT M. W. HANSON.

Witnesses:
F. E. ANDERSON,
FRANCES E. BLODGETT.